(12) United States Patent
Baba et al.

(10) Patent No.: US 9,793,573 B2
(45) Date of Patent: Oct. 17, 2017

(54) LITHIUM ION SECONDARY BATTERY CONTAINING A NON-POLAR ACTIVE MATERIAL

(75) Inventors: Mamoru Baba, Iwate (JP); Takayuki Fujita, Niigata (JP)

(73) Assignee: NAMICS CORPORATION, Niigata (JP)

( * ) Notice: Subject to any disclaimer, the term of this patent is extended or adjusted under 35 U.S.C. 154(b) by 687 days.

(21) Appl. No.: 14/127,065

(22) PCT Filed: May 31, 2012

(86) PCT No.: PCT/JP2012/064175
§ 371 (c)(1),
(2), (4) Date: Mar. 31, 2014

(87) PCT Pub. No.: WO2012/176604
PCT Pub. Date: Dec. 27, 2012

(65) Prior Publication Data
US 2014/0220393 A1    Aug. 7, 2014

(30) Foreign Application Priority Data
Jun. 20, 2011 (JP) ................................ 2011-136693

(51) Int. Cl.
| | |
|---|---|
| H01M 4/58 | (2010.01) |
| H01M 10/04 | (2006.01) |
| H01M 4/505 | (2010.01) |
| H01M 10/0525 | (2010.01) |
| H01M 10/0585 | (2010.01) |
| H01M 2/20 | (2006.01) |

(52) U.S. Cl.
CPC ....... H01M 10/0436 (2013.01); H01M 2/202 (2013.01); H01M 4/505 (2013.01); H01M 10/0525 (2013.01); H01M 10/0585 (2013.01); Y02E 60/122 (2013.01); Y02P 70/54 (2015.11)

(58) Field of Classification Search
CPC ......... H01M 10/0436; H01M 10/0525; H01M 10/0585; H01M 2/202; H01M 4/505; Y02E 60/122
See application file for complete search history.

(56) References Cited

U.S. PATENT DOCUMENTS

| | | | |
|---|---|---|---|
| 2004/0029011 A1* | 2/2004 | Ravet ...................... | H01M 4/36 429/231.95 |
| 2004/0096735 A1* | 5/2004 | Komatsu ............... | H01M 2/021 429/176 |
| 2009/0087739 A1 | 4/2009 | Takahashi | |
| 2012/0021280 A1* | 1/2012 | Katase .................. | H01G 11/22 429/211 |

FOREIGN PATENT DOCUMENTS

| | | |
|---|---|---|
| JP | 01-120765 | 5/1989 |
| JP | 11-185753 | 7/1999 |
| JP | 2001-192210 | 7/2001 |
| JP | 2001-210374 | 8/2001 |
| JP | 2002-042862 | 2/2002 |
| JP | 2005-063958 | 3/2005 |
| JP | 2007-258165 | 10/2007 |
| JP | 2008-235260 | 10/2008 |
| JP | 2009-211965 | 9/2009 |
| JP | 4762353 B | 8/2011 |
| WO | WO 2007/086289 | 8/2007 |
| WO | WO 2008/099508 | 8/2008 |
| WO | WO 2011/077964 | 6/2011 |
| WO | WO 2011/125482 | 10/2011 |

* cited by examiner

*Primary Examiner* — Raymond Alejandro
(74) *Attorney, Agent, or Firm* — Hamre, Schumann, Mueller & Larson, P.C.

(57) ABSTRACT

A lithium ion secondary battery that can be charged without regard to polarity is disclosed. The lithium ion secondary battery includes a lithium ion secondary battery unit, which includes a first electrode layer and a second electrode layer that are laminated on an electrolytic region. The first electrode layer and the second electrode layer contain $Li_2Mn_2O_4$ as a common active material.

9 Claims, 7 Drawing Sheets

(a)

(b)

(a)

(b)

☐ NONPOLAR ACTIVE MATERIAL LAYER  ■ ELECTROLYTE LAYER

Prior Art

_US 9,793,573 B2_

LITHIUM ION SECONDARY BATTERY CONTAINING A NON-POLAR ACTIVE MATERIAL

TECHNICAL FIELD

The present invention relates to a lithium ion secondary battery in which electrode layers are alternately laminated via an electrolytic region.

BACKGROUND ART

With outstanding advancement of electronics technology in recent years, portable electronic devices have been made smaller, lighter, and thinner, and equipped with multiple functions. According to this, batteries as power sources for electronic devices are required to be smaller, lighter, thinner, and highly reliable. In response to the demand, there has been proposed a multilayer lithium ion secondary battery in which a plurality of positive layers and a plurality of negative layers are alternately laminated with solid electrolyte layers interposed therebetween. The multilayer lithium ion secondary battery is assembled by laminating battery cells with a thickness of several tens of micrometers. Therefore, the battery can be readily made smaller, lighter, and thinner. In particular, a parallel or series-parallel laminated battery is excellent in achieving a large discharge capacity with a small cell area. In addition, because an all-solid lithium ion secondary battery includes solid electrolyte instead of electrolytic solution, the all-solid lithium ion secondary battery is immune to leakage or depletion of liquid and has high reliability. Furthermore, because the all-solid lithium ion secondary battery includes lithium, the all-solid lithium ion secondary battery provides high voltage and high energy density.

FIG. 8 is a cross sectional view illustrating a conventional lithium ion secondary battery (Patent Document 1). The conventional lithium ion secondary battery is configured to have a laminated body in which a positive layer 101, a solid electrolyte layer 102, and a negative layer 103 are laminated in sequence; and terminal electrodes 104 and 105 connected electrically to the positive layer 101 and the negative layer 103, respectively. FIG. 8 shows the battery formed by one laminated body for convenience of description. In actuality, however, the battery is generally formed by laminating the large number of positive layers, solid electrolyte layers, and negative layers in sequence to provide a large battery capacity. An active material constituting the positive layers is different from an active material constituting the negative layers. That is, a substance with a higher oxidation-reduction potential is selected as a positive active material, and a substance with a lower oxidation-reduction potential is selected as a negative active material. In the thus structured battery, if the terminal electrode on the negative side is regarded to be under a reference voltage, a positive voltage is applied to the terminal electrode on the positive side to charge the battery. Meanwhile, on discharging, a positive voltage is output from the terminal electrode on the positive side.

In contrast, since the positive active material has only the function as a positive material, and the negative active material has only the function as a negative material, the battery is not charged when a negative voltage is applied to the positive side terminal electrode and a positive voltage is applied to the negative side terminal electrode (so-called "reverse voltage application").

In the conventional secondary battery, each active material layer is clearly determined as a positive electrode or a negative electrode (polar battery). Thus, when reverse voltage is applied to the conventional secondary battery, the battery does not function normally as a secondary battery. Furthermore, reverse voltage should not be applied to the secondary battery, particularly when a liquid electrolyte is employed. Otherwise, the electrode metal may be eluted into the electrolyte and precipitated. The precipitated metal may penetrate the separator, and a peeled metal may float in the liquid electrolyte. As a result, the battery may be broken by short circuit and heating in the battery.

Even when a solid electrolyte is used as the electrolyte, the active material could be damaged by reverse charging, whereby the original function of the secondary battery may not be recovered upon recharging.

For these reasons, the conventional secondary batteries have been strictly designed so that a high voltage can be applied from a negative material to a positive active material at the time of charging. Further, in the case of forming an assembled battery in which polar secondary batteries are connected in series, the positive electrode of one cell is electrically connected to the negative electrode of another cell without fail. Thus, the product of the electromotive force of a single cell and the number of the cells connected in series is obtained as an output voltage. The output voltage of the assembled battery is therefore uniquely determined, and has been impossible to convert the output voltage without using an external electronic circuit.

CITATION LIST

Patent Literatures

Patent Literature 1: WO/2008/099508
Patent Literature 2: JP-A-2007-258165
Patent Literature 3: JP-A-2008-235260
Patent Literature 4: JP-A-2009-211965

SUMMARY OF INVENTION

Problems to be Solved by the Invention

An object of the present invention is to realize a battery that can be charged without regard to polarity.

Another object of the present invention is to realize an assembled battery capable of changing its charge-discharge voltage and storage capacity as needed through the setting of lead-out electrode connection without using an external voltage conversion circuit.

Solutions to the Problems

According to the present invention (1), a lithium ion secondary battery includes a lithium ion secondary battery unit cell including a first electrode layer and a second electrode layer which are alternately laminated via an electrolytic region. The first electrode layer and the second electrode layer contain $Li_2Mn_2O_4$ as a common active material.

According to the present invention (2), a battery includes a plurality of lithium ion secondary battery unit cells connected in series, each of the lithium ion secondary battery unit cells including a first electrode layer and a second electrode layer which are alternately laminated via an electrolytic region, the electrode layers containing a nonpolar active material; and a lead-out electrode extending independently from each point of the series connection to the outside of a battery unit.

According to the present invention (3), in the lithium ion secondary battery according to the invention (2), the nonpolar active material has both a Li-ion absorption capability and a Li-ion release capability; and the nonpolar active material is a composite oxide including at least Li and Mn.

According to the present invention (4), in the lithium ion secondary battery according to the invention (2), the nonpolar active material is $Li_2Mn_2O_4$.

According to the present invention (5), an electronic apparatus uses the lithium ion secondary battery according to any one of the inventions (1) to (4) as a power source.

According to the present invention (6), an electronic apparatus uses the lithium ion secondary battery according to any one of the inventions (1) to (4) as a storage element.

According to the present invention (7), a method configures a battery with a different output voltage or a different battery capacity by changing the connection of the lead-out electrodes in the lithium ion secondary battery according to any one of the inventions (2) to (4).

Effects of the Invention

According to the present inventions (1) to (4), and (7), a nonpolar lithium ion battery can be realized, whereby the terminal electrodes do not need to be distinguished. As a result, the secondary battery can be charged without regard to the polarity. Further, by variously setting the connection of the lead-out electrode terminals from the common assembled battery, a battery with an arbitrary voltage or capacity can be configured. As a result, the degree of freedom in circuit design of the electronic apparatus can be increased.

According to the present inventions (5) and (6), a secondary battery or a storage element having the arbitrary voltage or capacity is used. Thus, the degree of freedom in circuit design of the electronic apparatus can be increased.

DESCRIPTION OF REFERENCE SIGNS

Figure 1:
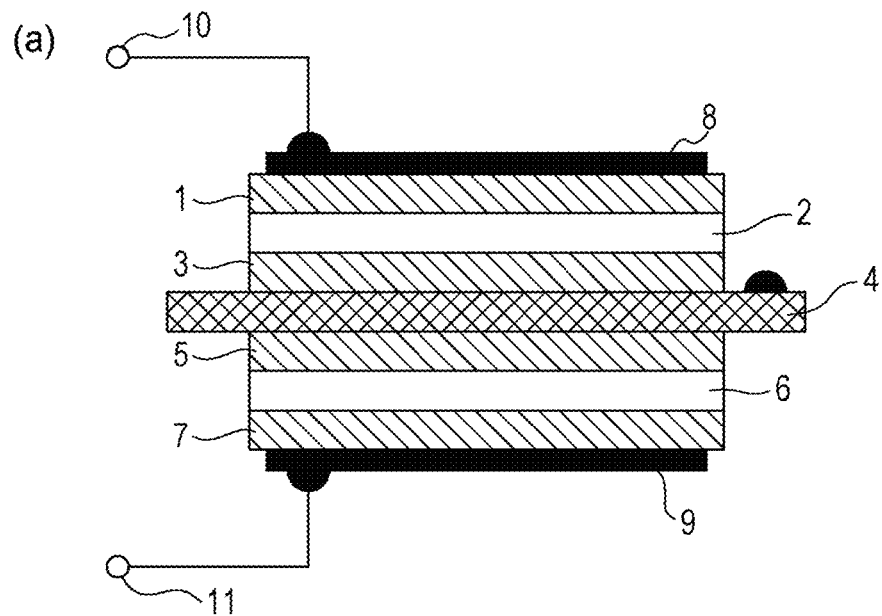
FIG. 1(a) is a cross sectional view of a series-connected lithium ion secondary battery according to an embodiment of the present invention.
FIG. 1(b) is a cross sectional view of a parallel-connected lithium ion secondary battery according to the embodiment of the present invention.
Figure 1:
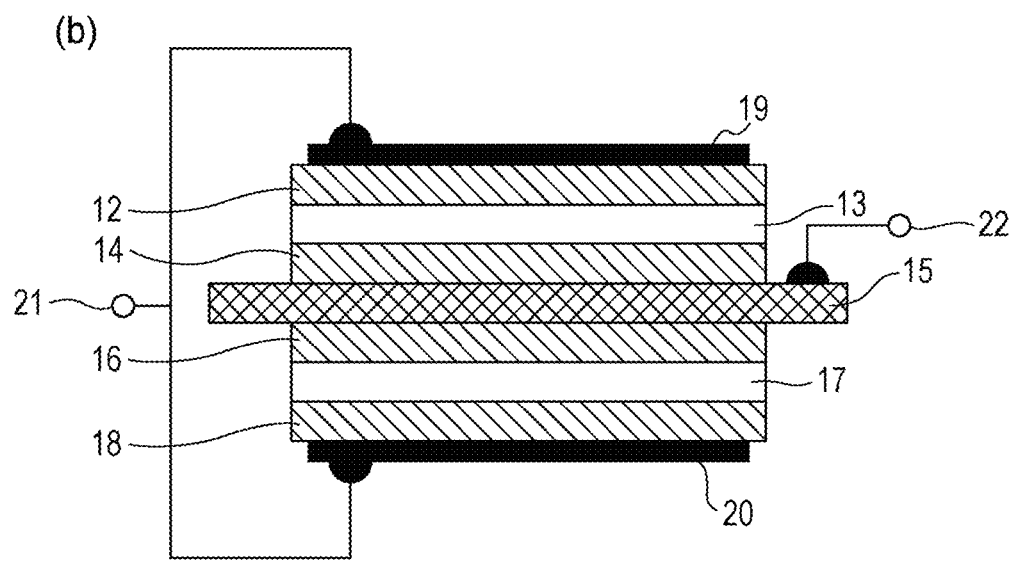

1, 3, 5, 7 Nonpolar active material layer
2, 6 Solid electrolyte layer
4 Conductive film
8, 9 Current collector layer
10, 11 Lead wire
12, 14, 16, 18 Nonpolar active material layer
13, 17 Solid electrolyte layer
15 Conductive film
19, 20 Current collector layer
21, 22 Lead wire
32, 34, 36, 38 Nonpolar active material layer
33, 37 Solid electrolyte layer
35 Metal film
31, 39 Current collector layer
41, 43, 47, 49 Nonpolar active material layer
42, 48 Solid electrolyte layer
45 Metal film
40, 44, 46, 50 Current collector layer
52, 54, 57, 60 Nonpolar active material layer
53, 59 Solid electrolyte layer
56 Insulating film
51, 55, 58, 61 Current collector layer
62 Through-hole portion
64, 66, 70, 72 Nonpolar active material layer
65, 71 Solid electrolyte layer
68 glass plate
63, 67, 69, 73 Current collector layer
74 External connection

DESCRIPTION OF EMBODIMENTS

A best embodiment of the present invention will be described below.

The inventors of the present application presumed that using the same active material for positive and negative electrodes makes it possible to manufacture and use a battery without the need for identifying the polarities of terminals of the battery, eliminate checking of the battery polarity, and simplify the process of manufacturing the battery. Hereinafter, a secondary battery not requiring identification of positive and negative electrodes will be referred to as "nonpolar secondary battery".

In addition, the term "nonpolar secondary battery cell" used herein refers to a secondary battery having a laminated structure of a nonpolar active material region, an electrolytic region, and a nonpolar active material region, which are respectively provided as single layers.

The present inventors thought that it is feasible to provide an assembled battery with functions of in-series batteries. Here, the assembled battery includes a plurality of the nonpolar secondary battery cells laminated in series, and the lead-out electrodes extend from the points of the serial connection of the battery cells to the outside of a battery unit, using as electrodes the lead-out electrodes on the opposite ends of the assembled battery. The inventors also thought that, depending on a manner of connecting the lead-out electrodes, it is feasible to provide the assembled battery with functions that have not been achieved by the conventional assembled batteries.

The inventors of the present application first studied realization of a nonpolar battery by a lithium ion secondary battery. In particular, the inventors earnestly examined an active material effective in realization of a nonpolar battery. As a result, the inventors found that a composite oxide containing a transition metal varying in multi-valence is useful as an active material for a nonpolar lithium ion secondary battery for the first time. The composite oxide functions as a positive active material of a lithium ion secondary battery that releases lithium ions to the outside of its structure according to an applied voltage. In addition, the composite oxide also functions as a negative active material because the composite oxide has a site for taking lithium ions into its structure. Here, having both the lithium ion releasability and the lithium ion absorbability means that, if the same active material is used for the positive and negative electrodes of a secondary battery, the active material exhibits both the lithium ion releasability and the lithium ion absorbability.

For example, in the case of using $Li_2Mn_2O_4$ any of the following reactions can occur:

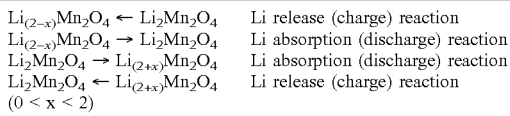

| | |
|---|---|
| $Li_{(2-x)}Mn_2O_4 \leftarrow Li_2Mn_2O_4$ | Li release (charge) reaction |
| $Li_{(2-x)}Mn_2O_4 \rightarrow Li_2Mn_2O_4$ | Li absorption (discharge) reaction |
| $Li_2Mn_2O_4 \rightarrow Li_{(2+x)}Mn_2O_4$ | Li absorption (discharge) reaction |
| $Li_2Mn_2O_4 \leftarrow Li_{(2+x)}Mn_2O_4$ | Li release (charge) reaction |
| $(0 < x < 2)$ | |

Therefore, $Li_2Mn_2O_4$ can be used as an active material for both electrodes of a nonpolar battery. It can be said that $Li_2Mn_2O_4$ has both the lithium ion releasability and the lithium ion absorbability.

On the other hand, in the case of using $LiCoO_2$, the following reactions can occur:

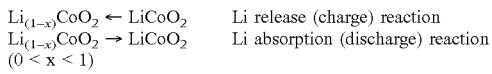

| | |
|---|---|
| $Li_{(1-x)}CoO_2 \leftarrow LiCoO_2$ | Li release (charge) reaction |
| $Li_{(1-x)}CoO_2 \rightarrow LiCoO_2$ | Li absorption (discharge) reaction |
| $(0 < x < 1)$ | |

However, the following reactions cannot occur:

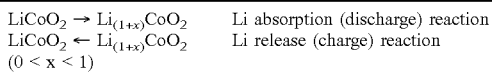

| | |
|---|---|
| $LiCoO_2 \rightarrow Li_{(1+x)}CoO_2$ | Li absorption (discharge) reaction |
| $LiCoO_2 \leftarrow Li_{(1+x)}CoO_2$ | Li release (charge) reaction |
| $(0 < x < 1)$ | |

Therefore, $LiCoO_2$ cannot be used as an active material for both electrodes of a nonpolar battery. It cannot be said that $LiCoO_2$ has both the lithium ion releasability and the lithium ion absorbability.

In addition, in the case of using $Li_4Ti_5O_{12}$, for example, the following reactions can occur:

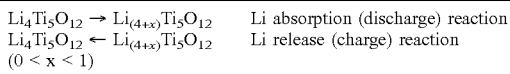

| | |
|---|---|
| $Li_4Ti_5O_{12} \rightarrow Li_{(4+x)}Ti_5O_{12}$ | Li absorption (discharge) reaction |
| $Li_4Ti_5O_{12} \leftarrow Li_{(4+x)}Ti_5O_{12}$ | Li release (charge) reaction |
| $(0 < x < 1)$ | |

However, the following reactions cannot occur:

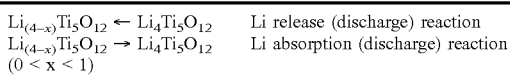

| | |
|---|---|
| $Li_{(4-x)}Ti_5O_{12} \leftarrow Li_4Ti_5O_{12}$ | Li release (discharge) reaction |
| $Li_{(4-x)}Ti_5O_{12} \rightarrow Li_4Ti_5O_{12}$ | Li absorption (discharge) reaction |
| $(0 < x < 1)$ | |

Therefore, $Li_4Ti_5O_{12}$ cannot be used as an active material for both electrodes of a nonpolar battery. It cannot be said that $Li_4Ti_5O_{12}$ has both the lithium ion releasability and the lithium ion absorbability.

In this description, the term "nonpolar active material" refers to an active material having both the lithium ion releasability and the lithium ion absorbability, and the term "polar active material" refers to an active material having not both the lithium ion releasability and the lithium ion absorbability.

Conditions for a nonpolar active material include: (a) the active material includes lithium in its structure; (b) the active material has a lithium ion dispersing path in its structure; (c) the active material has a site for absorbing lithium ions in its structure; (d) the average valence of a base metal element constituting the active material can be both higher and lower than a valence on synthesis of the active material; and (e) the active material has moderate electron conductivity. The active material used in the present invention can be any of active materials that meet the foregoing conditions (a) to (e). An example of a transition metal composite oxide having layered structure is, for example, $Li_2Mn_2O_4$. However, not limited to these materials, any active materials in which a part of Mn of $Li_2Mn_2O_4$ is substituted by metal other than Mn meet the foregoing conditions (a) to (e). Therefore, it is needless to say that such an active material can be suitably used as an active material for a lithium ion secondary battery according to the present invention.

(Battery Structure)

Figure 2:
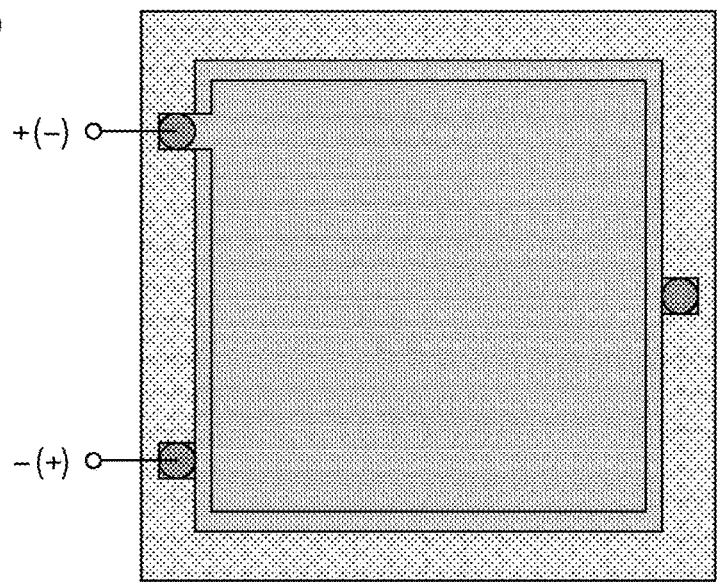
FIG. 2(a) is a plan view of the series-connected lithium ion secondary battery according to the embodiment of the present invention.
FIG. 2(b) is a plan view of the parallel-connected lithium ion secondary battery according to the embodiment of the present invention.
Figure 2:
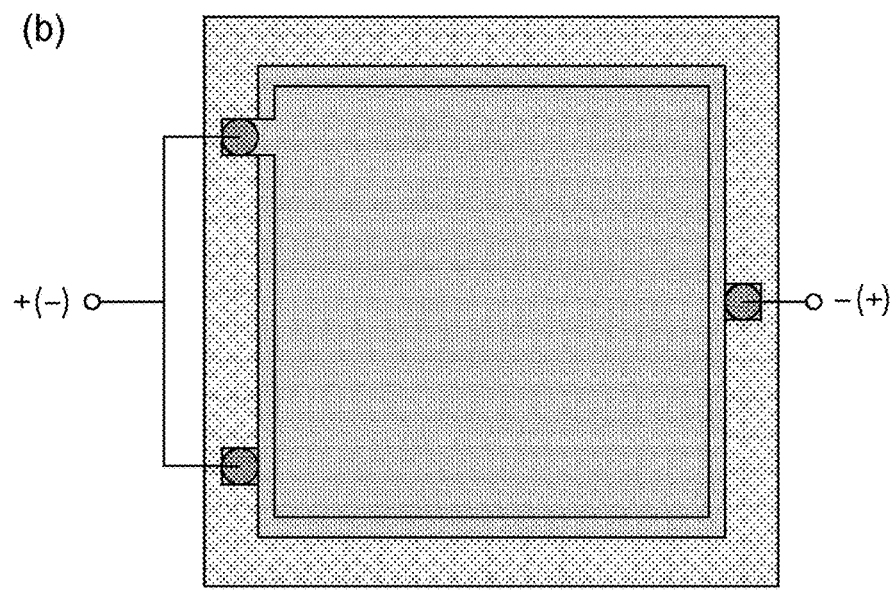

FIG. 1(a) is a cross sectional view of a series-connected lithium ion secondary battery according to an embodiment of the present invention, and FIG. 2(a) is a plan view of the lithium ion secondary battery.

The lithium ion secondary battery illustrated in FIG. 1(a) includes a conductive film 4; a battery cell in which a nonpolar active material layer 3, a solid electrolyte layer 2, layer 1, and a current collector layer 8 are successively laminated on one side of the conductive film 4; and a battery cell in which a nonpolar active material layer 5, a solid electrolyte layer 6, a nonpolar active material layer 7, and a current collector layer 9 are successively laminated on the other side of the conductive film 4. A lead wire 10 is electrically connected to the current collector layer 8, and a lead wire 11 is electrically connected to the current collector layer 9.

The material of the nonpolar active material layer used herein is a material with the functions of both the positive active material and the negative active material. For example, charging is performed such that the lead wire 10 has a positive potential with respect to the lead wire 11. In this case, the nonpolar active material layers 1 and 5 function as positive layers, and the nonpolar active material layers 3 and 7 function as negative layers. When charging is performed such that the lead wire 10 has a negative potential with respect to the lead wire 11, the nonpolar active material layers 1 and 5 function as negative layers while the nonpolar active material layers 3 and 7 function as positive layers.

The battery illustrated in FIG. 1(a) is a configuration example in which two battery cells are laminated and connected in series via the conductive film 4. However, the number n of laminated layers is not limited to two. Alternatively, the number n of laminated layers may be 1, or n≥3. When a plurality of battery cells (n≥2) is connected in series, a secondary battery capable of supplying a higher voltage than a single battery cell can be produced.

The term "conductive film" used herein refers to a film made of a conductive organic material or a conductive inorganic material. The conductive film may be of the same material as the material of the current collector layer as long as the film can function as a substrate for forming other thin films and is physically robust.

FIG. 1(b) is a cross sectional view of a parallel-connected lithium ion secondary battery according to the embodiment of the present invention. FIG. 2(b) is a plan view of the parallel-connected lithium ion secondary battery.

The lithium ion secondary battery illustrated in FIG. 1(b) includes a conductive film 15; a battery cell in which a nonpolar active material layer 14, a solid electrolyte layer 13, a nonpolar active material layer 12, and a current collector layer 19 are successively laminated on one side of the conductive film 15; and a battery cell in which a nonpolar active material layer 16, a solid electrolyte layer 17, a nonpolar active material layer 18, and a current collector layer 20 are successively laminated on the other side of the conductive film 15.

A lead wire 21 is electrically connected to the current collector layer 19 and the current collector layer 20. A lead wire 22 is electrically connected to the conductive film 15.

Here too, as the material of the nonpolar active material layer, a material with the functions of the positive active material and the negative active material described above is used. For example, charging is performed such that the lead wire 21 has a positive potential with respect to the lead wire 22. In this case, the nonpolar active material layers 12 and 18 function as positive layers, and the nonpolar active material layers 14 and 16 function as negative layers. When charging is performed such that the lead wire 21 has a negative potential with respect to the lead wire 22, the nonpolar active material layers 12 and 18 function as negative layers while the nonpolar active material layers 14 and 16 function as positive layers.

The battery illustrated in FIG. 1(b) is a configuration example in which two battery cells are laminated and connected in parallel via the conductive film 15. The number n of laminated layers is not limited to 2. The number n of laminated layers may be 1, or n≥3. When a plurality of battery cells (n≥2) is connected in parallel, a secondary battery having a greater capacity than a single battery cell can be produced.

As in the exemplified battery illustrated in FIGS. 1(a) and 1(b), therefore, the use of the common battery structure allows the battery to obtain a high voltage through a series connection of the battery cells, or allow the battery to supply a large capacity of electric power through a parallel connection of the battery cells. Note that these are enabled by the use of the nonpolar active material in the active material layers. When a polar active material is used, a battery function through series connection can be obtained only in the following case: when charging by applying a positive voltage to the lead wire 10, the member 1 is a positive electrode, the member 3 is a negative electrode, the member 5 is a positive electrode, and the member 7 is a negative electrode. In this case, charging cannot be performed through series connection by applying a negative voltage to the lead wire 10. In the case of the parallel connection illustrated in FIG. 1(b), charging or discharging cannot be properly performed because the polarities of the battery cells arranged in parallel are not aligned. Thus, conventionally, the method of using the battery has been limited. However, by using the nonpolar active material, a function that has not been possible can be realized.

(Other Embodiment of Battery Structure)

FIGS. 3(a) to 3(d) illustrate cross sectional views of the lithium ion secondary battery according to another embodiment of the present invention.

Figure 3:
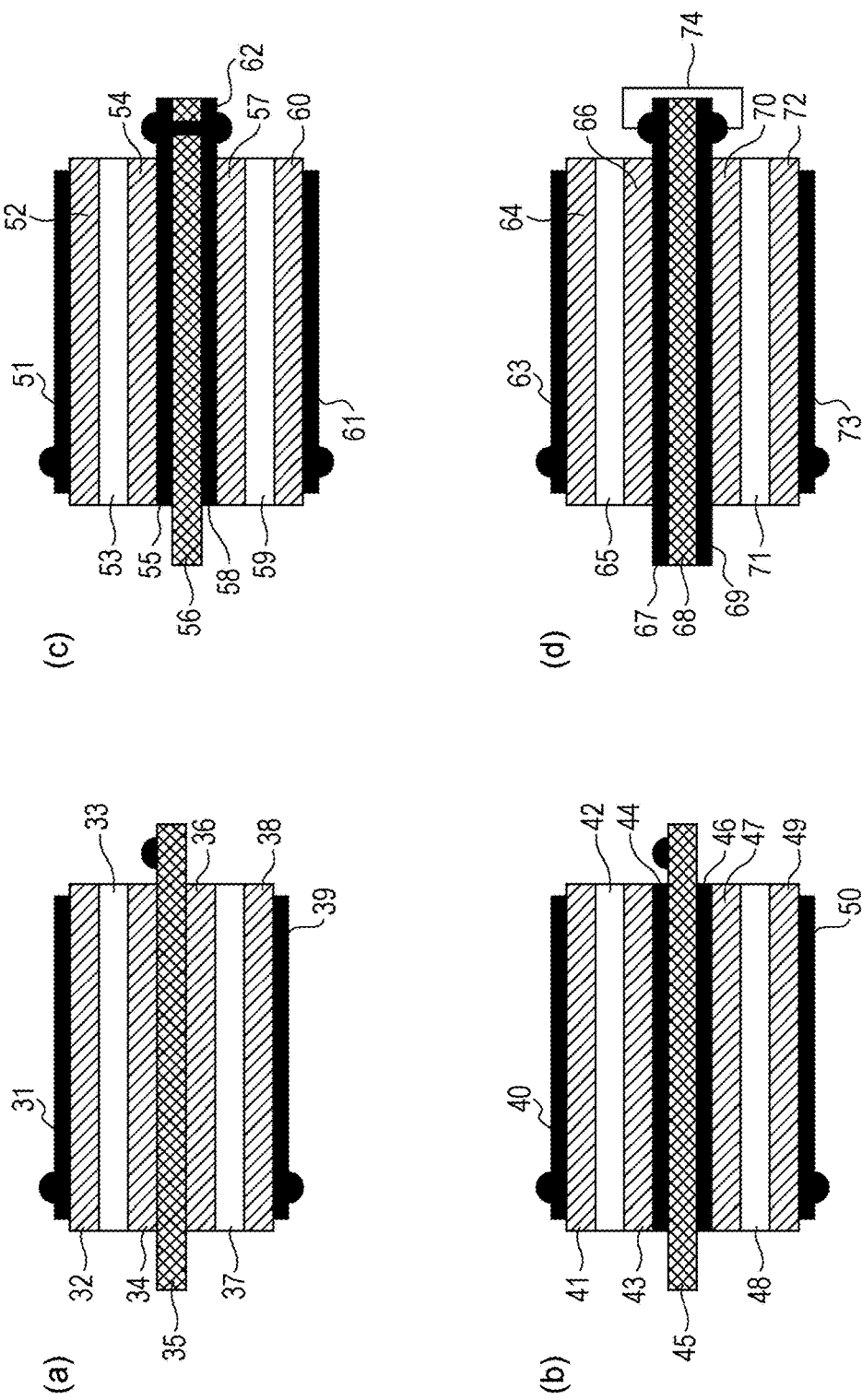
FIGS. 3(a) to 3(d) are cross sectional views of the lithium ion secondary battery according to another embodiment of the present invention.

The lithium ion secondary battery illustrated in FIG. 3(a) includes, as in the secondary battery illustrated in FIGS. 1(a) and 1(b), a battery cell including a nonpolar active material layer 34, a solid electrolyte layer 33, a nonpolar active material layer 32, and a current collector layer 31; and a battery cell including a nonpolar active material layer 36, a solid electrolyte layer 37, a nonpolar active material layer 38, and a current collector layer 39. The secondary battery according to the present embodiment differs from the secondary battery illustrated in FIGS. 1(a) and 1(b) in that the two battery cells are connected by a metal film 35.

The lithium ion secondary battery illustrated in FIG. 3(b) includes a battery cell including a current collector layer 44, a nonpolar active material layer 43, a solid electrolyte layer 42, a nonpolar active material layer 41, and a current collector layer 40; and a battery cell including a current collector layer 46, a nonpolar active material layer 47, a solid electrolyte layer 48, a nonpolar active material layer 49, and a current collector layer 50. The two battery cells are connected by a metal film 45.

The lithium ion secondary battery illustrated in FIG. 3(c) includes a battery cell including a current collector layer 55, a nonpolar active material layer 54, a solid electrolyte layer 53, a nonpolar active material layer 52, and a current collector layer 51; and a battery cell including a current collector layer 58, a nonpolar active material layer 57, a solid electrolyte layer 59, a nonpolar active material layer 60, and a current collector layer 61. The two battery cells are connected by an insulating film 56. Further, for electrically connecting the current collector layer 55 and the current collector layer 58, a through-hole portion 62 penetrating the insulating film 56 is formed. In the through-hole portion 62, a conductive member is embedded.

The lithium ion secondary battery illustrated in FIG. 3(d) includes a battery cell including a current collector layer 67, a nonpolar active material layer 66, a solid electrolyte layer 65, a nonpolar active material layer 64, and a current collector layer 63; and a battery cell including a current collector layer 69, a nonpolar active material layer 70, a solid electrolyte layer 71, a nonpolar active material layer 72, and a current collector layer 73. The two battery cells are connected by an insulating glass plate 68. The current collector layer 67 and the current collector layer 69 are electrically connected by an external connection 74.

Thus, a preferred mode of the present invention has been described with reference to the examples in which the electrolytic region is a solid electrolyte layer. However, the advantageous effect of the lithium ion secondary battery according to the present invention is not limited to the case where the electrolytic region is a solid electrolyte layer. It goes without saying that a similar advantageous effect can be obtained when the electrolytic region is formed by a liquid electrolyte or a polymer electrolyte, for example, as long as the active material layer of the lithium ion secondary battery is a nonpolar active material layer.

(Material for Battery)

(Material for Active Material)

The nonpolar active material constituting the electrode layer of the lithium ion secondary battery of the present invention is preferably a material that efficiently release or absorb lithium ions. For example, a transition metal element constituting the active material preferably varies in multivalence. For example, the active material is preferably Li$_2$Mn$_2$O$_4$. Alternatively, the active material is preferably Li$_2$MnxMe$_2$-xO$_4$ (Me=Ni, Cu, V, Co, Fe, Ti, Al, Si, or P, 0.5≤x<1) in which a part of Mn is substituted by another transition metal element. The active material is preferably one or more materials selected from the foregoing group of substances.

(Material for Solid Electrolyte)

The solid electrolyte constituting the solid electrolyte layer of the lithium ion secondary battery of the present invention is preferably a material with low electronic conductivity and high lithium ion conductivity, for example, at least one kind of a material selected from the group consisting of: oxide including lithium, lanthanum, and titanium; oxide including lithium, lanthanum, tantalum, barium, and titanium; polyanion oxide not including a multivalent transition element including lithium; polyanion oxide including lithium, a representative element, and at least one kind of a transition element; lithium silicon phosphate (Li$_{3.5}$Si$_{0.5}$P$_{0.5}$O$_4$); lithium titanium phosphate (LiTi$_2$(PO$_4$)$_2$); lithium germanium phosphate (LiGe$_2$(PO$_4$)$_3$); Li$_2$O—SiO$_2$; Li$_2$O—V$_2$O$_5$—SiO$_2$; Li$_2$O—P$_2$O$_5$—B$_2$O$_3$; and Li$_2$O—GeO$_2$. In addition, the material for the solid electrolyte layer is preferably ceramic including at least lithium, phosphorus, and silicon. Furthermore, the material for the solid electrolyte layer may be any of these materials doped with a different kind of element or Li$_3$PO$_4$, LiPO$_3$, Li$_4$SiO$_4$, Li$_2$SiO$_3$, LiBO$_2$, or the like. In addition, the material for the solid electrolyte layer may be a crystalline material, an amorphous material, or a glass material.

(Material of Current Collector Layer)

Preferably, a material with high electrical conductivity is used as the conductive substance of the current collector layers of the lithium ion secondary battery according to the present invention. Specific examples include metals such as silver, vanadium, gold, palladium, copper, nickel, and aluminum. Other than the materials mentioned above, conductive metals or alloys may also be suitably used as long as they are not oxidized under a nonpolar active material layer forming condition when forming the nonpolar active material layer on the current collector electrode.

(Method of Modifying Battery Characteristics by Utilizing Nonpolar Secondary Battery)

By using the nonpolar secondary battery according to the present invention, a single laminated battery can be used as a secondary battery with a different output voltage or as a secondary battery with a different battery capacity by simply modifying the external connection.

FIGS. 4(a) to 4(d) illustrate an exemplary connection of the external connection of the assembled battery using the lithium ion secondary battery according to an embodiment of the present invention.

FIG. 4(a) shows an assembled battery including two laminated battery cells with external terminals connected in parallel, in a charging state (left) and a charging-completed state (right). Each battery cell includes one electrolyte layer (black portion) with one nonpolar active material layer (white portion) disposed on each side of the electrolyte layer. Between the battery cells, a conductive film for conduction and extending lead-out electrodes to the outside, for example, is disposed. The battery cells are bonded to the conductive film via a conductive adhesive or the like. At the time of charging, when a positive voltage is applied to the terminal A and a negative voltage is applied to the terminal B, the active material layer connected to the terminal A functions as a positive electrode and takes in lithium ions, while the active material layer connected to the terminal B functions as a negative electrode and takes in electrons. As a result, after completion of charging, the assembled battery functions as a battery with the terminal A as the positive voltage terminal and the terminal B as the negative voltage terminal. When the output voltage of the single battery cell is V0 and its battery capacity is C0, the formed assembled battery has the output voltage of V0 and the battery capacity of 2×C0.

FIG. 4(b) illustrates an assembled battery including two laminated battery cells with external terminals connected in series, in a charging state (left) and a charging-completed state (right). At the time of charging, when a positive voltage is applied to the terminal A and a negative voltage is applied to the terminal B, the active material layer connected to the terminal A functions as a positive electrode and takes in lithium ions, while the active material layer connected to the terminal B functions as a negative electrode and takes in electrons.

As a result, after completion of charging, the assembled battery functions as a battery with the terminal A as the positive voltage terminal and the terminal B as the negative voltage terminal. The formed assembled battery has the battery capacity of C0, and the output voltage of 2×V0.

FIG. 4(c) illustrates an assembled battery including five laminated battery cells with external terminals connected in parallel, in a charging state (left) and a charging-completed state (right). At the time of charging, when a positive voltage is applied to the terminal A and a negative voltage is applied to the terminal B, the active material layer connected to the terminal A functions as a positive electrode and takes in lithium ions, while the active material layer connected to the terminal B functions as a negative electrode and takes in electrons.

As a result, after completion of charging, the assembled battery functions as a battery with the terminal A as the positive voltage terminal and the terminal B as the negative voltage terminal. The formed assembled battery has the output voltage of V0, and the battery capacity of 5×C0.

FIG. 4(d) illustrates an assembled battery including five laminated battery cells with external terminals connected in series, in a charging state (left) and a charging-completed state (right). At the time of charging, when a positive voltage is applied to the terminal A and a negative voltage is applied to the terminal B, the active material layer connected to the terminal A functions as a positive electrode and takes in lithium ions, while the active material layer connected to the terminal B functions as a negative electrode and takes in electrons.

As a result, after completion of charging, the assembled battery functions as a battery with the terminal A as the positive voltage terminal and the terminal B as the negative voltage terminal. The formed assembled battery has the battery capacity of C0, and the output voltage of 5×V0.

Figure 4:
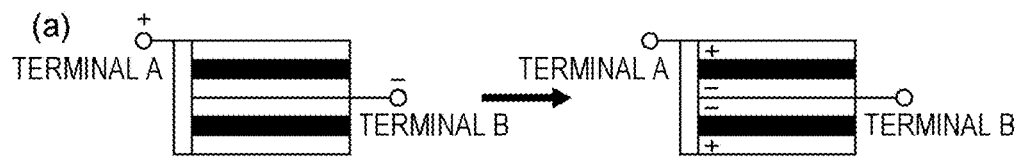
FIGS. 4(a) to 4(d) illustrate exemplary connections of the external connection of an assembled battery using the lithium ion secondary battery according to an embodiment of the present invention.
Figure 4:
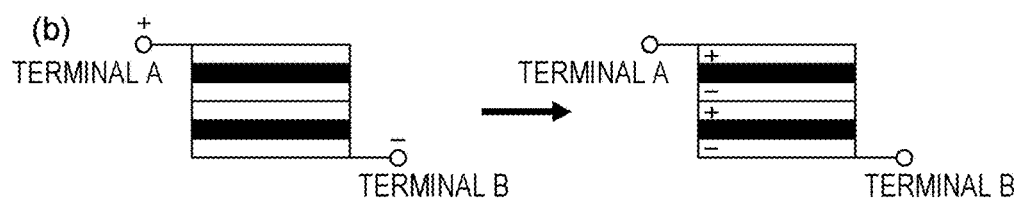
Figure 4:
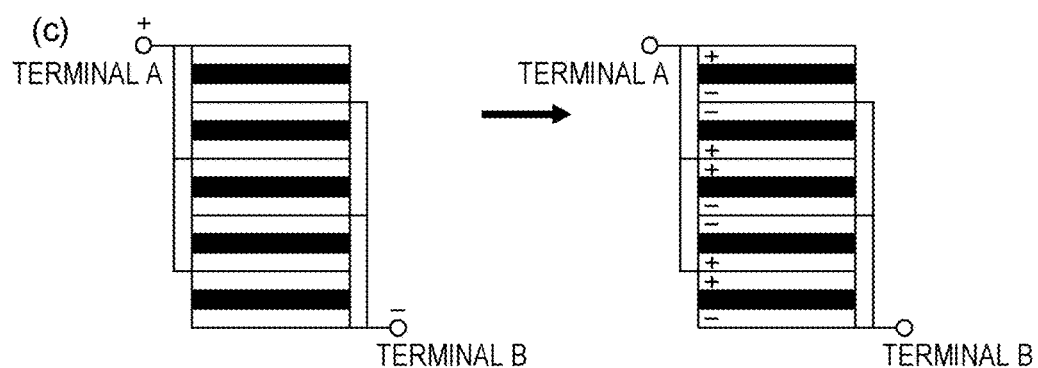
Figure 4:
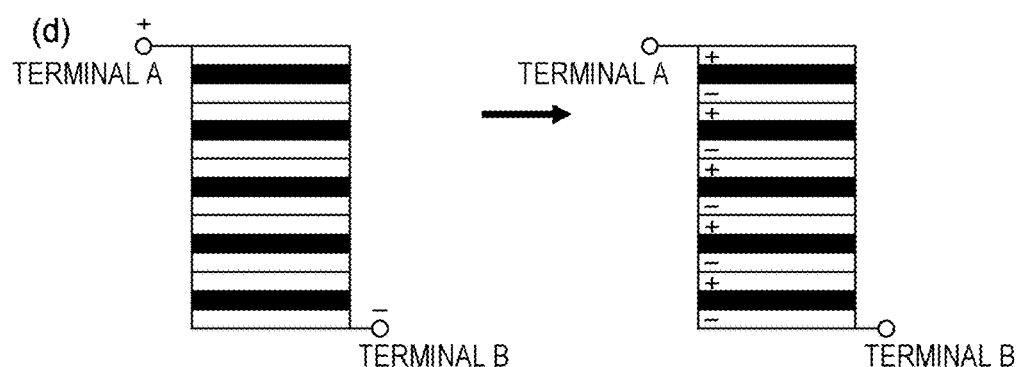
Figure 5:
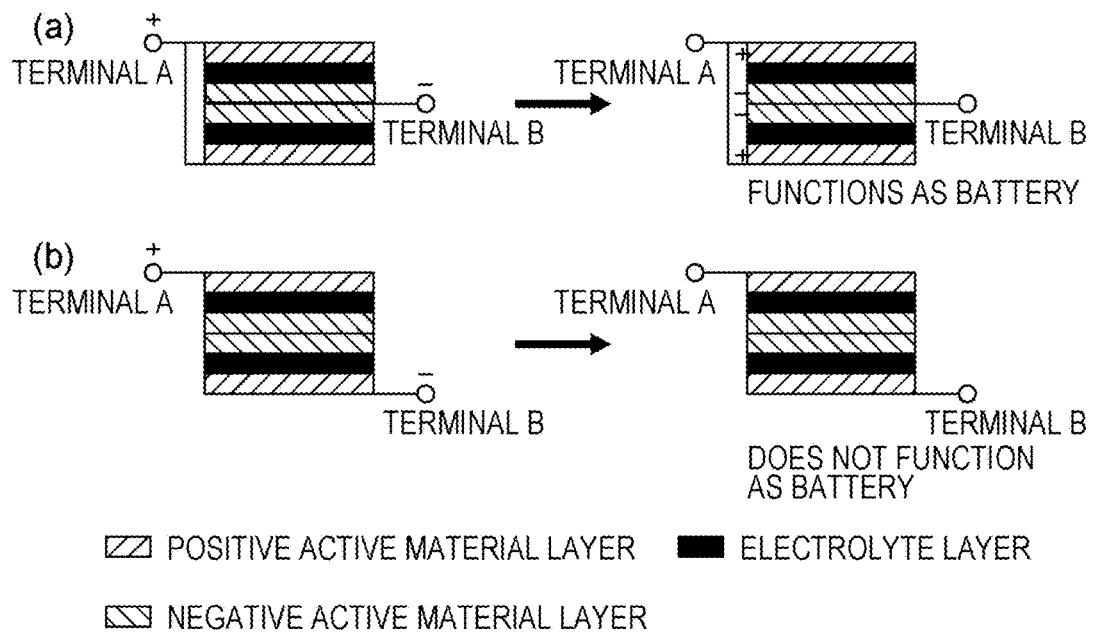
FIGS. 5(a) to 5(b) are diagrams illustrating the problem of charging an assembled battery using a conventional polar lithium ion secondary battery.

On the other hand, if conventional polar battery cells are used, the modification of external connections as illustrated in FIG. 4 cannot be performed. FIGS. 5(a) and 5(b) are diagrams illustrating the problem of charging an assembled battery using a conventional polar lithium ion secondary battery. A polar secondary battery cell is formed by laminating a negative active material layer, an electrolyte layer, and a positive active material layer in order. In FIG. 5(a), two polar secondary battery cells are laminated, with a parallel external connection. For charging, a positive voltage is applied to the terminal A and a negative voltage is applied to the terminal B. In this case, the terminal A is connected to the positive active material layer, and the terminal B is connected to the negative active material layer. Thus, charging can normally occur, and the battery normally functions after completion of charging.

On the other hand, in FIG. 5(b), the same assembled battery is charged in series connection, and a positive voltage is applied to the terminal A while a negative voltage is applied to the terminal B. In this case, while the terminal A is connected to the positive active material layer, the terminal B is also connected to the positive active material layer of the other battery cell. Thus, charging does not normally occur, and the assembled battery does not function as a battery.

(Battery Manufacturing Method)

In the following, a method of manufacturing the lithium ion secondary battery illustrated in FIG. 1(a) according to the present invention will be described.

First, the first nonpolar active material layer 3 is formed on the conductive film 4 as a substrate. Preferably, the nonpolar active material layer 3 may have a film thickness such that a charge-discharge capacity can be ensured and yet as thin as possible, such as on the order of 0.05 to 5 μm. Then, the solid electrolyte layer 2 is formed on the nonpolar active material layer 3. Preferably, the solid electrolyte layer 2 may have a film thickness such that the development of a pinhole can be decreased and yet as thin as possible, such as on the order of 0.05 to 1 μm. Then, the second nonpolar active material layer 1 is formed on the solid electrolyte layer 2. Preferably, the nonpolar active material layer 1 may have a film thickness such that a charge-discharge capacity can be ensured and yet as thin as possible, such as on the order of 0.05 to 5 μm. On the nonpolar active material layer 1, the current collector layer 8 is formed, whereby the battery cell on one side is completed. Preferably, the current collector layer 8 may have a film thickness such that electric resistance can be decreased and as thin as possible, such as on the order of 0.05 to 1 μm. Thereafter, the battery cell on the other side is constructed by the same method. Finally, lead wires are connected, and the lithium ion secondary battery is completed.

As a method of forming the thin films (the first nonpolar active material layer, the solid electrolyte layer, the second nonpolar active material layer, and the current collector layer), for example, sputtering, ion beam deposition, electron beam deposition, resistance heating deposition, or ion beam sputtering may be used. Other methods, such as applying and sintering a paste containing thin film material, plating, or CVD may also be used. More preferably, a vacuum film forming method by which a thinner and more uniform thin film can be formed may be used. Even more preferably, sputtering, by which a film can be formed uniformly and with a small misalignment in atomic composition with the deposition substance, may be used.

(Difference from Similar Prior Art)

Patent Document 2 describes an all-solid battery that includes a material including polyanion for all of active materials and solid electrolyte. According to only the claims of Patent Document 2, there exists a combination of the same positive active material and negative active material. However, the battery described in Patent Document 2 is intended to realize higher power output, longer lifetime, improved safety, and reduced cost of the battery, not to unpolarize the battery. In actuality, Patent Document 2 describes a battery including different active materials for positive and negative electrodes (that is, a battery that cannot be used as a nonpolar battery) in an embodiment. Therefore, it is not possible to easily contrive a lithium ion secondary battery that includes the same active material for positive and negative electrodes for the purpose of unpolarization according to the present invention, from the description of Patent Document 2.

Patent Document 3 describes a wet battery including liquid electrolyte and the same active material for opposite electrodes. The same active material is used for the opposite electrodes to set a difference in potential between the active materials at production to 0, thereby preventing electrolysis of the electrolytic solution. That is, the wet battery described in Patent Document 3 is devised to reduce risk of burst and ignition due to gas generated by electrolysis of the electrolytic solution. Accordingly, the battery described in Patent Document 3 is also intended to realize storage stability of the battery, not to unpolarize the battery. In addition, Patent Document 3 does not describe any active material suitable for a high-performance nonpolar battery. In addition, Patent Document 3 describes in an example a coin-type battery with a diameter of more than ten mm in which structures of positive and negative electrodes are asymmetry. Accordingly, it is not possible to easily contrive a lithium ion secondary battery that includes the same active material for positive and negative electrodes from the description of Patent Document 3, for the purpose of unpolarization according to the present invention.

Patent Document 4 discloses a nonpolar lithium ion secondary battery in which an active material for opposite electrodes of the battery includes $Li_2FeS_2$. The active material $Li_2FeS_2$ described in Patent Document 4 also has both the lithium ion releasability and the lithium ion absorbability. However, this substance has many problems as a material for a battery, unlike a composite oxide containing a transition metal varying in multi-valence, which is the active material according to the present invention. For example, $Li_2FeS_2$ has high material reactivity, as described in Patent Document 4, paragraph [0036]. Accordingly, because $Li_2FeS_2$ cannot be synthesized in the atmosphere, $Li_2FeS_2$ is synthesized by vacuum heating. Therefore, it is necessary to use a vacuum device in manufacturing equipment, which results in increase of manufacturing cost. Similarly, $Li_2FeS_2$ does not allow for simultaneous sintering of a laminated body in the atmosphere. In addition, because $Li_2FeS_2$ is a sulfide, $Li_2FeS_2$ reacts with water in the atmosphere to generate hydrogen sulfide. Accordingly, as shown in FIG. 1 in Patent Document 4, it is necessary to provide an outer can around the battery for sealing, which makes it difficult to downsize the battery.

(Applications of Battery to Purpose Other than Power Source)

The lithium ion secondary battery according to the present invention can be used in applications other than power source. A possible factor behind that is a problem of increase in power source wiring resistance due to decrease in wire width associated with reduction in size and weight of electronic devices. For example, when electric power consumed by a CPU of a notebook personal computer increases, a power supply voltage supplied to the CPU becomes under a minimum drive voltage if a power source wiring resistance is high, which may cause a problem such as a signal processing error or crash. Accordingly, a power storage element formed by a smoothing capacitor is disposed between a power supply device such as an AC/DC converter or a DC/DC converter and a load device such as a CPU to suppress ripple in a power supply line. This allows constant power to be supplied to the load device even if there is a temporary reduction in power supply voltage. However, power storage elements such as an aluminum electrolytic capacitor and a tantalum electrolytic capacitor, are based on a power storage principle that a dielectric body is polarized.

Therefore, these power storage elements have a drawback of small power storage density. In addition, these power storage elements include electrolytic solution. This makes it difficult to mount these elements near a component on a substrate by solder reflow.

In contrast to this, the lithium ion secondary battery according to the present invention can be mounted in the proximity of a component (load device) on a substrate. In particular, if the lithium ion secondary battery according to the present invention is mounted close to a component with high power consumption and is used as a power storage element, the battery can function as a power storage device to a maximum extent. Furthermore, because the lithium ion secondary battery according to the present invention is an extremely small-sized nonpolar battery, the lithium ion secondary battery can be easily attached to a mounting board. The battery, which includes inorganic solid electrolyte, has high heat resistance and can be mounted by solder reflow. In addition, because the lithium ion secondary battery is based on a power storage principle that lithium ions move between electrodes, the lithium ion secondary battery has a high power storage density. Accordingly, when being used as a power storage element, the nonpolar lithium ion secondary battery can function as an excellent smoothing capacitor and/or a backup power source. As a result, stable power can be supplied to the load device. In addition, because such a storage element is nonpolar and changeable of its voltage and capacity depending on the connection, it is possible to provide advantages of improving the degree of freedom for designing a circuit and a mounting board, and reducing the number of parts.

EXAMPLES

In the following, the present invention will be described in detail with reference to examples.

(Construction of Nonpolar Secondary Battery Sample)

As a conductive film for a substrate, a metal foil containing vanadium and measuring 300 μm in size and thickness was prepared.

Then, on the conductive film, the first nonpolar active material layer was formed by sputtering. The first nonpolar active material layer was formed by RF magnetron sputtering using a sintered target of lithium manganate ($Li_2Mn_2O_4$) and introducing oxygen. RF power was 1 kw, and the film was formed without heating. In this way, a 0.2 μm lithium manganate thin film was formed.

Next, the solid electrolyte layer was formed on the nonpolar active material layer by sputtering. The solid electrolyte layer was formed by RF magnetron sputtering using a sintered target of lithium phosphate ($Li_3PO_4$) and introducing nitride gas. RF power was 1 kw, and the film was formed without heating. In this way, a 0.1 μm lithium phosphate thin film to which nitrogen had been added was formed.

Then, on the solid electrolyte layer, the second nonpolar active material layer was formed by sputtering. The second nonpolar active material layer was formed by RF magnetron sputtering using a sintered target of lithium manganate ($Li_2Mn_2O_4$) and introducing oxygen. RF power was 1 kw, and the film was formed without heating. In this way, a 0.2 μm lithium manganate thin film was formed.

Then, on the second nonpolar active material layer, the current collector layer was formed by sputtering. The current collector layer was formed by DC magnetron sputtering using a vanadium metal target. DC power was 1 kw, and the film was formed without heating. In this way, a 0.1-1 μm vanadium thin film was formed as the current collector layer.

Finally, lead wires were connected to the current collector layer, whereby the nonpolar lithium ion secondary battery was completed.

(Evaluation of Battery Characteristics)

Figure 6:
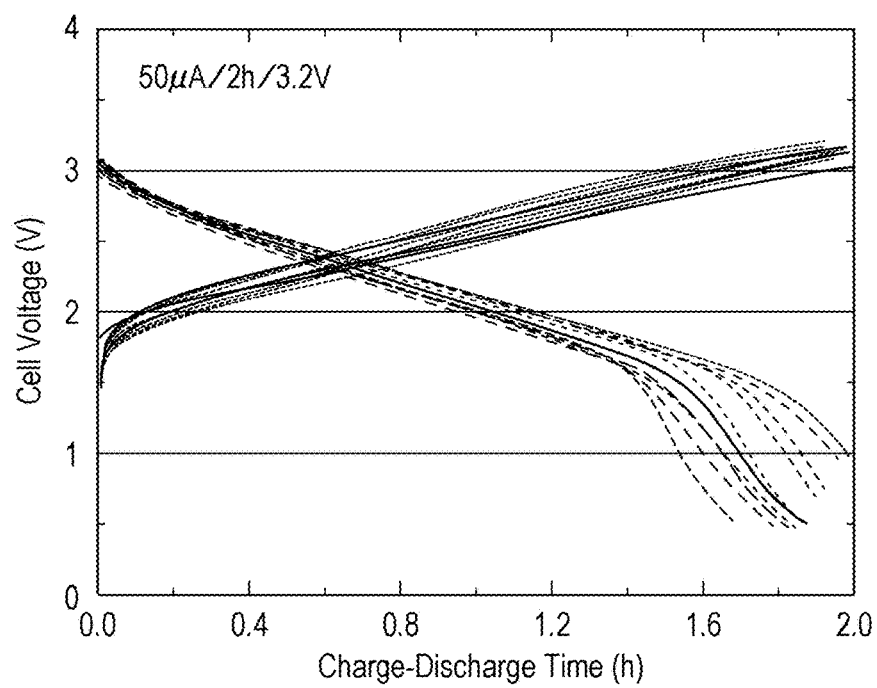
FIG. 6 is a graph of the charge-discharge characteristics of a nonpolar battery according to an embodiment of the present invention.

FIG. 6 is a graph of the charge-discharge characteristics of the nonpolar secondary battery according to the embodiment of the present invention. A battery sample of the nonpolar secondary battery of FIG. 6 was constructed from a laminated body including a positive layer, a solid electrolyte layer, and a negative layer, using $Li_2Mn_2O_4$ as the positive and negative electrode materials.

As indicated by the measurement result illustrated in FIG. 6, the inter-terminal voltage during charging increases from about 1 V to 3 V over time. During discharging, the voltage decreases from about 3 V to 1 V. Thus, it is seen that the nonpolar secondary battery according to the present invention provides a normal function as a secondary battery. Accordingly, it will be seen that when a battery in which $Li_2Mn_2O_4$ is used in both the positive electrode and the negative electrode is constructed and charged, lithium ions are deintercalated from the $Li_2Mn_2O_4$ of the pole that is positively charged (+) by a charger into the electrolyte, while the lithium ions that have passed through the electrolyte are intercalated into the $Li_2Mn_2O_4$ of the pole that is negatively charged (−).

Figure 7:
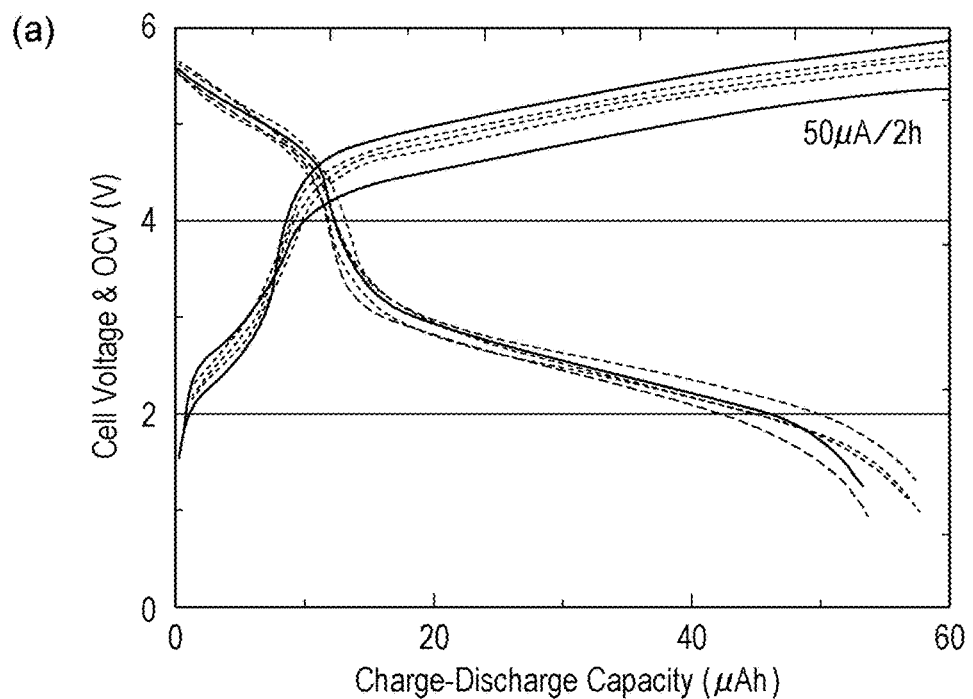
FIGS. 7(a) and 7(b) are graphs of the charge-discharge characteristics of a nonpolar assembled battery according to an embodiment of the present invention.
Figure 7:
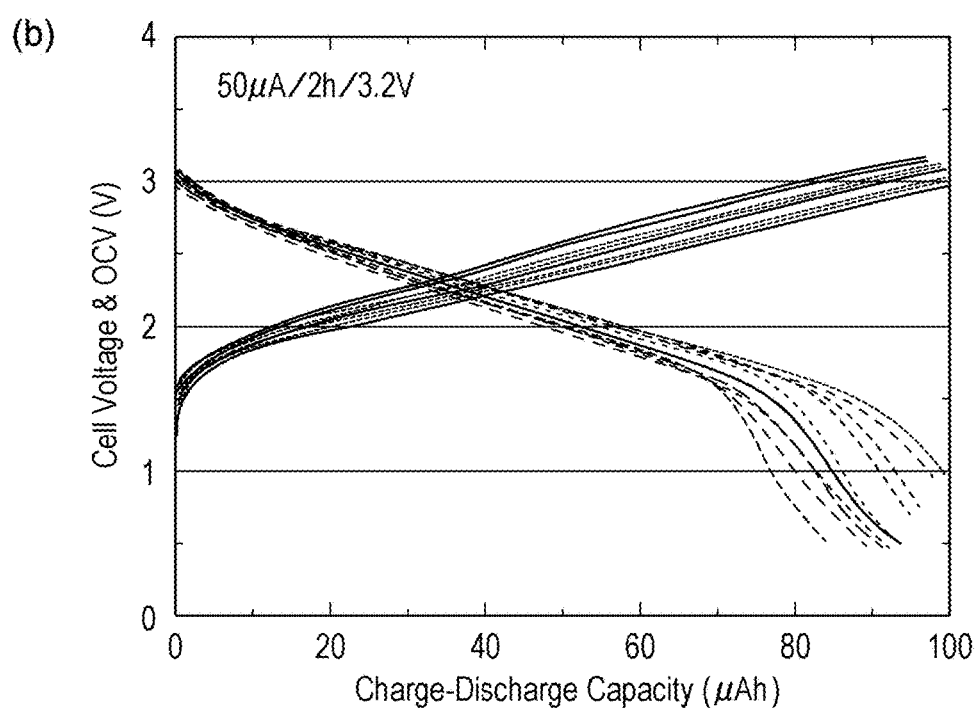
Figure 8:
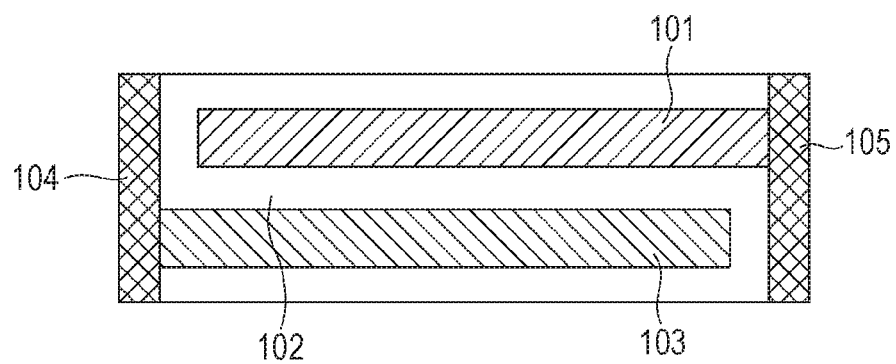
FIG. 8 is a cross sectional view of a conventional lithium ion secondary battery.

FIG. 7(a) is a graph of the charge-discharge characteristics of a battery including two of the nonpolar secondary batteries illustrated in FIG. 4 connected in series. As illustrated in FIG. 7(a), the charge start voltage of the series-connected battery is approximately twice the voltage in the case of parallel connection. Thus, it has been confirmed that charging can be performed without problems up to approximately twice the cell charge voltage.

FIG. 7(b) is a graph of the charge-discharge characteristics of a battery in which two of the nonpolar secondary batteries illustrated in FIG. 6 were connected in parallel. As illustrated in FIG. 7(b), the charge start voltage of the parallel-connected battery exhibits a start voltage similar to the cell charge voltage, indicating that the amount of electricity stored until the upper-limit cell charge voltage is reached is approximately twice the cell.

INDUSTRIAL APPLICABILITY

As described above in detail, the secondary battery according to the present invention enables simplification of the manufacturing process and mounting process for the lithium ion secondary battery. Further, in the assembled battery according to the present invention, the output voltage and output capacity of the battery can be changed by merely setting the external connection. As a result, the secondary battery according to the present invention can increase the degree of freedom in circuit designing, and greatly contribute to the field of electronics.

The invention claimed is:

1. A lithium ion secondary battery comprising:
   a laminated body that comprises a first electrode layer, a second electrode layer, and an electrolyte layer,
   wherein
   the first electrode layer is disposed directly on one side of the electrolyte layer and the second electrode layer is disposed directly on the other side of the electrolyte layer,
   each of the first electrode layer and the second electrode layer consists of a non-polar active material, and
   the non-polar active material is $Li_2Mn_2O_4$.

2. An electronic apparatus including the lithium ion secondary battery according to claim 1 as a power source.

3. An electronic apparatus including the lithium ion secondary battery according to claim 1 as a storage element.

4. A lithium ion secondary battery comprising:

a plurality of lithium ion secondary battery unit cells, a current collector layer that is disposed on one of the plurality of lithium ion secondary unit cells, a conductive film that is disposed on (1) the one of the plurality of lithium ion secondary unit cells, (2) another one of the plurality of lithium ion secondary unit cells, or (3) the current collector layer, and a lead wire that is electrically connected to at least one of the current collector layer and the conductive film, wherein each of the lithium ion secondary battery unit cells is connected to one another, each of the lithium ion secondary battery unit cells comprises a laminated body, the laminated body comprises a first electrode layer, a second electrode layer, and an electrolyte layer, the first electrode layer is disposed directly on one side of the electrolyte layer and the second electrode layer is disposed directly on the other side of the electrolyte layer, each of the first electrode layer and the second electrode layer consists of a non-polar active material, and the non-polar active material is $Li_2Mn_2O_4$.

5. The lithium ion secondary battery according to claim 4, wherein the plurality of lithium ion secondary battery unit cells are connected to each other in series.

6. The lithium ion secondary battery according to claim 4, wherein the plurality of lithium ion secondary battery unit cells are connected to each other in parallel.

7. An electronic apparatus including the lithium ion secondary battery according to claim 4 as a power source.

8. An electronic apparatus including the lithium ion secondary battery according to claim 4 as a storage element.

9. A method for modifying battery characteristics, comprising changing an output voltage or battery capacity of the lithium ion secondary battery according to claim 4 by changing a connection of the lead wire that is electrically connected to at least one of the current collector layer and the conductive film.

* * * * *